(12) United States Patent
Ebert et al.

(10) Patent No.: US 12,073,341 B2
(45) Date of Patent: Aug. 27, 2024

(54) PROACTIVE SPATIOTEMPORAL RESOURCE ALLOCATION AND PREDICTIVE VISUAL ANALYTICS SYSTEM

(71) Applicant: Purdue Research Foundation, West Lafayette, IN (US)

(72) Inventors: David Scott Ebert, West Lafayette, IN (US); Abish Malik, West Lafayette, IN (US); Sherry Towers, Tempe, AZ (US); Ross Maciejewski, Phoenix, AZ (US)

(73) Assignee: Purdue Research Foundation, West Lafayette, IN (US)

( * ) Notice: Subject to any disclaimer, the term of this patent is extended or adjusted under 35 U.S.C. 154(b) by 816 days.

(21) Appl. No.: 16/792,785

(22) Filed: Feb. 17, 2020

(65) Prior Publication Data

US 2020/0242523 A1 Jul. 30, 2020

Related U.S. Application Data

(63) Continuation of application No. 14/941,485, filed on Nov. 13, 2015, now abandoned.

(60) Provisional application No. 62/079,413, filed on Nov. 13, 2014.

(51) Int. Cl.
*G06N 20/00* (2019.01)
*G06Q 10/06* (2023.01)
(52) U.S. Cl.
CPC ............ *G06Q 10/06* (2013.01); *G06N 20/00* (2019.01)
(58) Field of Classification Search
None
See application file for complete search history.

(56) References Cited

U.S. PATENT DOCUMENTS

| 2007/0180522 A1* | 8/2007 | Bagnall | G06F 21/577 709/224 |
| 2012/0089920 A1* | 4/2012 | Eick | G06T 11/206 715/739 |
| 2013/0057551 A1* | 3/2013 | Ebert | G06K 9/6218 345/440 |

(Continued)

FOREIGN PATENT DOCUMENTS

KR 20140065568 * 5/2014

*Primary Examiner* — David R Vincent
(74) *Attorney, Agent, or Firm* — Piroozi-IP, LLC

(57) ABSTRACT

Disclosed herein is a visual analytics system and method that provides a proactive and predictive environment in order to assist decision makers in making effective resource allocation and deployment decisions. The challenges involved with such predictive analytics processes include end-users' understanding, and the application of the underlying statistical algorithms at the right spatiotemporal granularity levels so that good prediction estimates can be established. In the disclosed approach, a suite of natural scale templates and methods are provided allowing users to focus and drill down to appropriate geospatial and temporal resolution levels. The disclosed forecasting technique is based on the Seasonal Trend decomposition based on Loess (STL) method applied in a spatiotemporal visual analytics context to provide analysts with predicted levels of future activity. A novel kernel density estimation technique is also disclosed, in which the prediction process is influenced by the spatial correlation of recent incidents at nearby locations.

29 Claims, 13 Drawing Sheets

(56) References Cited

U.S. PATENT DOCUMENTS

| | | | |
|---|---|---|---|
| 2014/0035921 A1* | 2/2014 | Yeh | G08G 1/13 345/440 |
| 2016/0057032 A1* | 2/2016 | Tieftrunk | G08G 5/0026 709/224 |
| 2016/0196747 A1* | 7/2016 | Tsyrklevich | G01C 21/3667 701/532 |
| 2017/0300840 A1* | 10/2017 | Rainey | G01W 1/06 |

* cited by examiner

PROACTIVE SPATIOTEMPORAL RESOURCE ALLOCATION AND PREDICTIVE VISUAL ANALYTICS SYSTEM

CROSS-REFERENCE TO RELATED APPLICATIONS

The present U.S. patent application is a continuation of U.S. patent application Ser. No. 14/941,485 filed Nov. 13, 2015, which is related to and claims the priority benefit of U.S. Provisional Patent Application Ser. No. 62/079,413 filed Nov. 13, 2014, the contents of which are hereby incorporated by reference in its entirety into this disclosure.

GOVERNMENT RIGHTS STATEMENT

This invention was made with government support under 2009-ST-061-C10003 awarded by the Department of Homeland Security. The government has certain rights in the invention.

TECHNICAL FIELD

The present disclosure generally relates data visualization and data analytics systems, and in particular to a method that uses a visual analytics approach to provide casual experts with a proactive and predictive environment that enables them to utilize their domain expertise while exploring their problem and making decisions and predictions at natural problem scales to increase their effectiveness and efficiency in planning, resource allocation, and deployment.

BACKGROUND

This section introduces aspects that may help facilitate a better understanding of the disclosure. Accordingly, these statements are to be read in this light and are not to be understood as admissions about what is or is not prior art.

The increasing availability of digital data provides both opportunities and challenges. The potential of utilizing these data for increasing effectiveness and efficiency of operations and decision making is vast. Harnessing this data with effective tools can transform decision making from reactive to proactive and predictive. However, the volume, variety, and velocity of these data can actually decrease the effectiveness of analysts and decision makers by creating cognitive overload and paralysis by analysis, especially in fast-paced decision making environments.

Many researchers in data visualization and visual analytics have proposed interactive visual analytical techniques to aid analysts in these tasks. Unfortunately, most work in this area has required these casual experts (experts in domains, but not necessarily statistics experts) to carefully choose appropriate parameters from a vast parameter space, select the proper resolution over which to perform their analysis, apply appropriate statistical or machine learning analysis techniques, and/or understand advanced statistical significance testing, while accounting for the different uncertainties in the data and processes.

Moreover, the casual experts are required to adapt their decision making process to the statistical analysis space where they need to choose the appropriate time and space scales that give them meaningful analytical and predictive results. They need to understand the role that data sparsity, different distribution characteristics, data variable co-dependencies, and data variance play in the accuracy and reliability of the analytical and prediction results. In moving to this proactive and predictive environment, scale issues become even more important. Not only does the choice of appropriate scales help guide the users' perception and interpretation of the data attributes, it also facilitates gaining new insight into the dynamics of the analytical tasks and the validity of the analytical product: a spatial resolution level that is too fine may lead to zero data input values with no predictive statistical value; whereas, a scale that is too coarse can overgeneralize the data and introduce variation and noise, reducing the value and specificity of the results. Therefore, it becomes critical for forecasting and analysis to choose statistically meaningful resolution and aggregation scales. There is therefore an unmet need for a visual analytics system that provides casual experts with a proactive and predictive environment that enables them to utilize their domain expertise while exploring their problem and making decisions and predictions at natural problem scales to increase their effectiveness and efficiency in planning, resource allocation, and deployment.

SUMMARY

According to one aspect, a method is disclosed, comprising receiving an input, the input comprising a geospatial natural scale template and a temporal natural scale template, subdividing the geospatial natural scale template based on a defined criteria to produce a plurality of geospatial sub-divisions, generating a time series historical signal for each of the plurality of sub-divisions within the geospatial natural scale template, the time series signal defined by the temporal natural scale template and based on historical activity data, generating a set of forecast results from each of the time series historical signals, and providing the set of forecast results as visual output on an electronic display to a user. The visual output may comprise a graphical representation of the geospatial subdivisions and an indicator of the forecast result for each of the geospatial subdivisions, the indicator displayed within a corresponding geospatial subdivision.

According to another aspect, a system is disclosed, comprising a computer processor, a memory, an input device, and an electronic display. The computer processor may be configured to receive an input, the input comprising a geospatial natural scale template and a temporal natural scale template, subdivide the geospatial natural scale template based on a defined criteria to produce a plurality of geospatial sub-divisions, generate a time series historical signal for each of the plurality of sub-divisions within the geospatial natural scale template, the time series signal defined by the temporal natural scale template, generate a set of forecast results from each of the time series historical signals, and provide the set of forecast results as visual output on the electronic display to a user.

DETAILED DESCRIPTION

Figure 1:
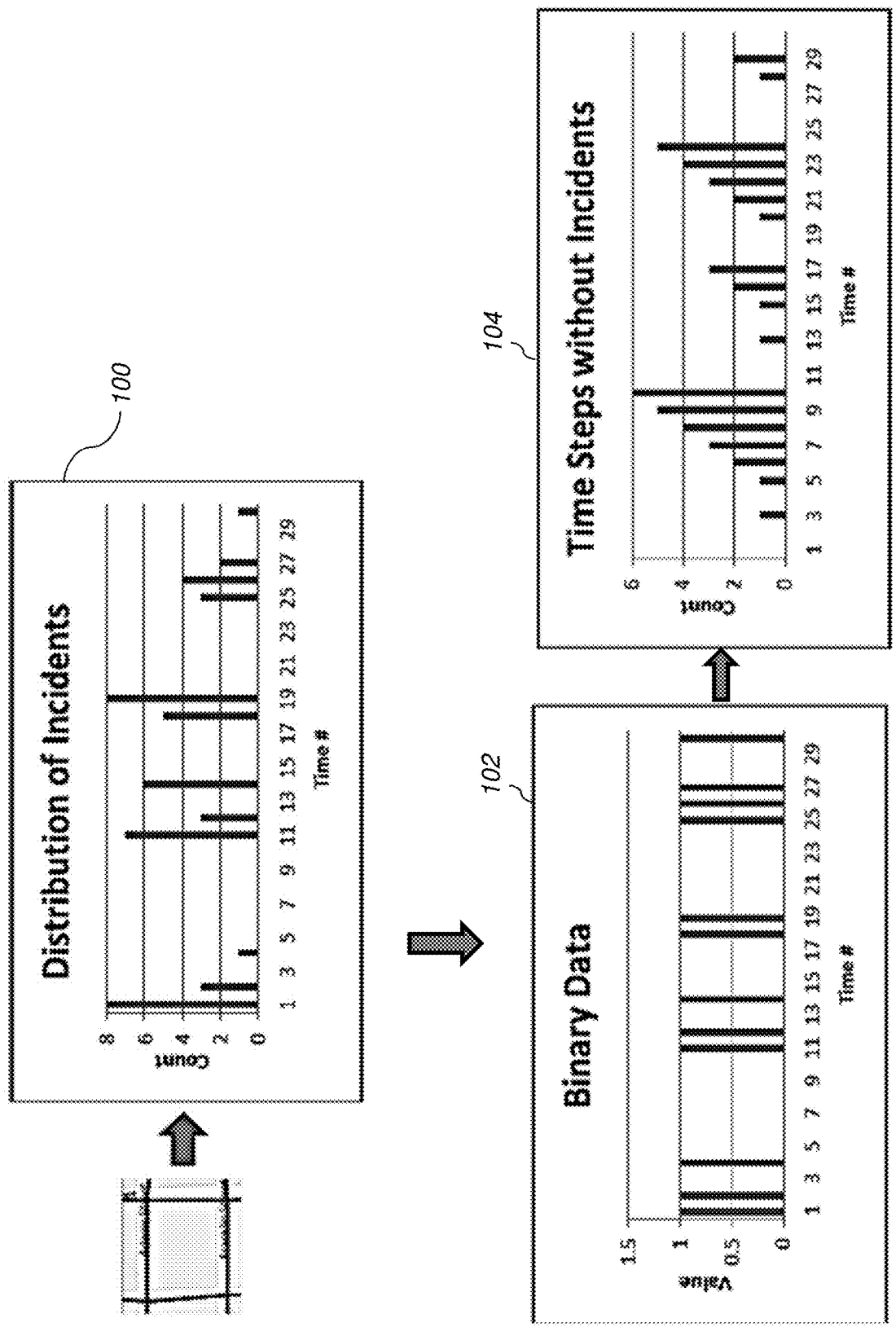
FIG. 1 is a diagram illustrating a natural scale template generation process according to one embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Disclosed herein is a visual analytics system 1000 (FIG. 8) that provides casual experts with a proactive and predictive environment that enables them to utilize their domain expertise while exploring their problem and making decisions and predictions at natural problem scales to increase their effectiveness and efficiency in planning, resource allocation, and deployment. Utilizing basic principles from scaling theory, and Norman's naturalness and appropriateness principles, the presently disclosed system 1000 can both balance and harness these cognitively meaningful natural human-centered domain scales with meaningful statistical scales.

The disclosed system 1000 provides interactive exploration of multisource, multivariate spatiotemporal datasets using linked views. The system 1000 enables the exploration of historic datasets and examination of trends, behaviors and interactions between the different spatiotemporal data elements. One goal of this disclosure, however, is to provide a proactive decision making environment where historic datasets are utilized at natural geospatial and temporal scales in order to guide future decisions and resource allocation strategies.

The disclosed system 1000 includes these novel natural spatial and temporal analytical techniques, as well as a novel Dynamic Covariance Kernel Density Estimation method (DCKDE) (discussed in further detail below). These aspects can be applied to a variety of spatiotemporal datasets including distribution and logistics, public safety, public health, and law enforcement. The system 1000 utilizes data from Criminal, Traffic, and Civil (CTC) incident law enforcement datasets in the examples throughout this disclosure. However, it should be noted that the herein disclosed technique is not limited to CTC incident law enforcement applications, and is, rather, versatile and can be adapted for other relevant spatiotemporal datasets that exhibit seasonality.

Crime Hotspot Policing and Intervention:

In recent years, there has been much research done that suggest the benefits of hot spot policing in preventing crime and disorder at these crime hotspots. The disclosed system 1000 enables law enforcement decision makers to identify and target crime hotspots by forecasting high probability crime regions based on historic spatiotemporal trends. The system 1000 also factors in the temporal variations within the signals and, as such, provides dynamic hotspot locations for each predicted day.

Predictive Policing:

There has also been much work done in criminology to study criminal behaviors in order to develop models that predict various offense incidence levels at different spatial aggregation levels. The disclosed system 1000 also allows analysts to conduct their predictive forecasting at different spatial resolutions (e.g., over uniform spatial grids and natural underlying spatial boundaries) and temporal granularity levels (e.g., by day, week, month). Furthermore, the system 1000 also allows users to create spatial and temporal templates for use in the prediction process.

Monthly and seasonal cycles and periodic properties of crime are known among criminologist. For example, the time of the day variation can be a factor in the analysis of crime and provide summary indicators that summarize the hour-of-day variations. Guidelines can be provided for breaking the day into quartiles based on the median hour of crime. The disclosed system 1000 optionally uses these guidelines to provide default data driven time-of-day templates over which to forecast crime. The disclosed system 1000 also utilizes these techniques and incorporates the seasonality and periodicity properties of crime in order to provide spatiotemporal forecasts of future crime incidence levels.

Time Series Prediction Using Seasonal-Trend Decomposition Based on LOESS (STL):

In order to model time series data, the system 1000 utilizes the seasonal-trend decomposition technique based on a locally weighted regression (loess) methodology (STL), where a time series signal is considered to consist of the sum of multiple components of variation. To accomplish this, the system 1000 utilizes the STL method to desynthesize the time series signal into its various components. An analysis of the underlying time series signal Y for CTC data reveals that a square root power transform stabilizes the variability and yields a more Normal distribution of time series residuals, which is a requirement to appropriately model the time series using STL. We consider the time series signal $\sqrt{Y}$ to consist of the sum of its individual components given by $\sqrt{Y_v}=T_v+S_v+D_v+R_v$, where, for the v-th time step, $T_v$ is the inter-annual component, $S_v$ is the yearly-seasonal component, $D_v$ is the day-of-the-week effect, and $R_v$ is the remainder variation component.

To predict using the STL method, a methodology is applied where the fitted values $\hat{Y}=(\hat{y}_1, \ldots, \hat{y}_n)$ generated using the loess operator in the STL decomposition step are considered to be a linear transformation of the input time series $Y=(y_1, \ldots, y_n)$. This is given by $\hat{y}_i=\Sigma_{i=1}^n h_{ij} y_j \Rightarrow \hat{Y}=HY$, where H is the operator matrix whose (i, j)-th diagonal elements are given by $h_{ij}$. In order to predict ahead by n days, we append the operator matrix H obtained from predicting ahead within each linear filter in the STL process with n new rows, and use this to obtain the predicted value. The predicted value for day n+1 is thereby given by $\hat{y}_{n+1}=\Sigma_{i=1}^n H_{n+1,i} Y_i$.

The presently disclosed system 1000 implements this approach of time series modeling and prediction and extends it into the spatiotemporal domain (as described further below). The system 1000 further factors in for the sparsity of data in certain geographical regions, and devise strategies to alleviate problems resulting in prediction in these sparse regions.

Natural Scale Templates:

In order to assist with the analysis process, the disclosed system 1000 provides natural scale templates that enable users to focus on appropriate geospatial and temporal resolution levels. These templates enable users to analyze their data at appropriate spatiotemporal granularity levels that help align the scale and frame of reference of the data analysis process with that of the decision making process. The templates also assist users in alleviating the impedance mismatch between data size/complexity and the decision makers' ability to understand and interact with data. A combination of the generated geospatial and temporal templates provide analysts with an appropriate starting point in the analysis process; thereby, eliminating the need to examine and analyze the entire spatiotemporal parameter space and reducing it to more manageable, appropriate scale levels. To be effective, the design of these scale templates must follow the appropriateness, naturalness, and matching cognitive principles. Simple scaling theory techniques are not sufficient (e.g., axometric scaling theory), but provide useful guidance to primitive scales of reference. The combinations of these design principles and the guidance from these statistical scale papers, provide the motivation and basis for our natural scale templates described below.

Geospatial Templates:

An underlying assumption with using STL to decompose time series is that the data are Normally distributed. The model predictions can get severely biased if this assumption is violated or if data are sparse. To remedy this, the disclosed system 1000 provides methods that help guide users in creating geospatial scales that allow them to drill down to higher incidence regions that may provide better prediction estimates.

Geospatial Natural Scale Templates Based on Spatiotemporal Incident Distribution:

The disclosed system 1000 allows users to narrow down the geographic space for the scope of analysis to regions with higher incidence counts and higher statistical significance for user-selected incident types. According to one aspect of the present disclosure, a geospatial natural scale template methodology is shown in FIG. 1. In order to generate geospatial templates, the system 1000 first fragments the geographic space into either uniform rectangular grids or man-made spatial demarcations (e.g., census blocks). Then, for each subregion, the system 1000 generates a time series 100 of the number of incidents that occurred within the subregion over time (e.g., by day, week, month). This signal is further cached for use later in the forecasting process. Next, the system 1000 converts this time series signal into a binary signal 102 across time, where a 1 represents that an incident occurred on a particular day and a 0 that no incident occurred. The system then counts the number of 0's between the 1's and progressively sum the number of 0's, outputting the result as another time series signal 104. As such, this signal 104 is a representation of the number of time steps over which no incidents occurred for the given subregion.

Figure 4A:
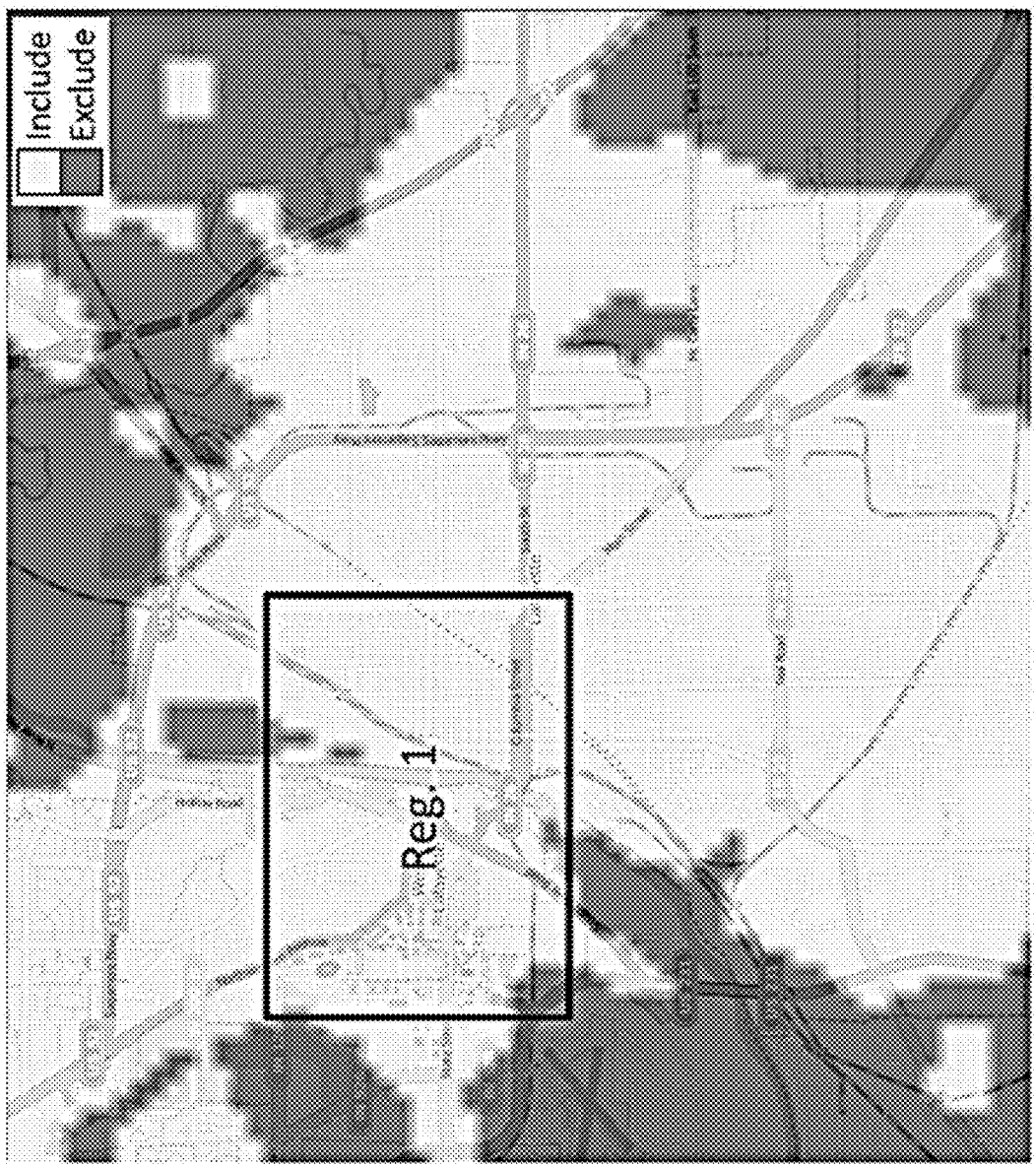
FIG. 4A shows a geospatial template according to one embodiment.

This new time series signal 104 is now utilized in the STL forecasting method (explained in detail in the above section "Time Series Prediction Using Seasonal-Trend Decomposition Based on LOESS (STL)") and a forecast value result is computed for the next day. It should be noted that the resulting time series for regions of lower incidence counts will not be sparse, and consequently, will generate higher predicted values. This process is repeated for all geospatial subregions and a unified picture is obtained for the next day. Finally, we filter out the regions with higher predicted values (low activity) by thresholding for the maximum value. The resulting filtered region forms the initial geospatial template. An example of a created geospatial template using this technique is shown in FIG. 4A.

Figure 4B:
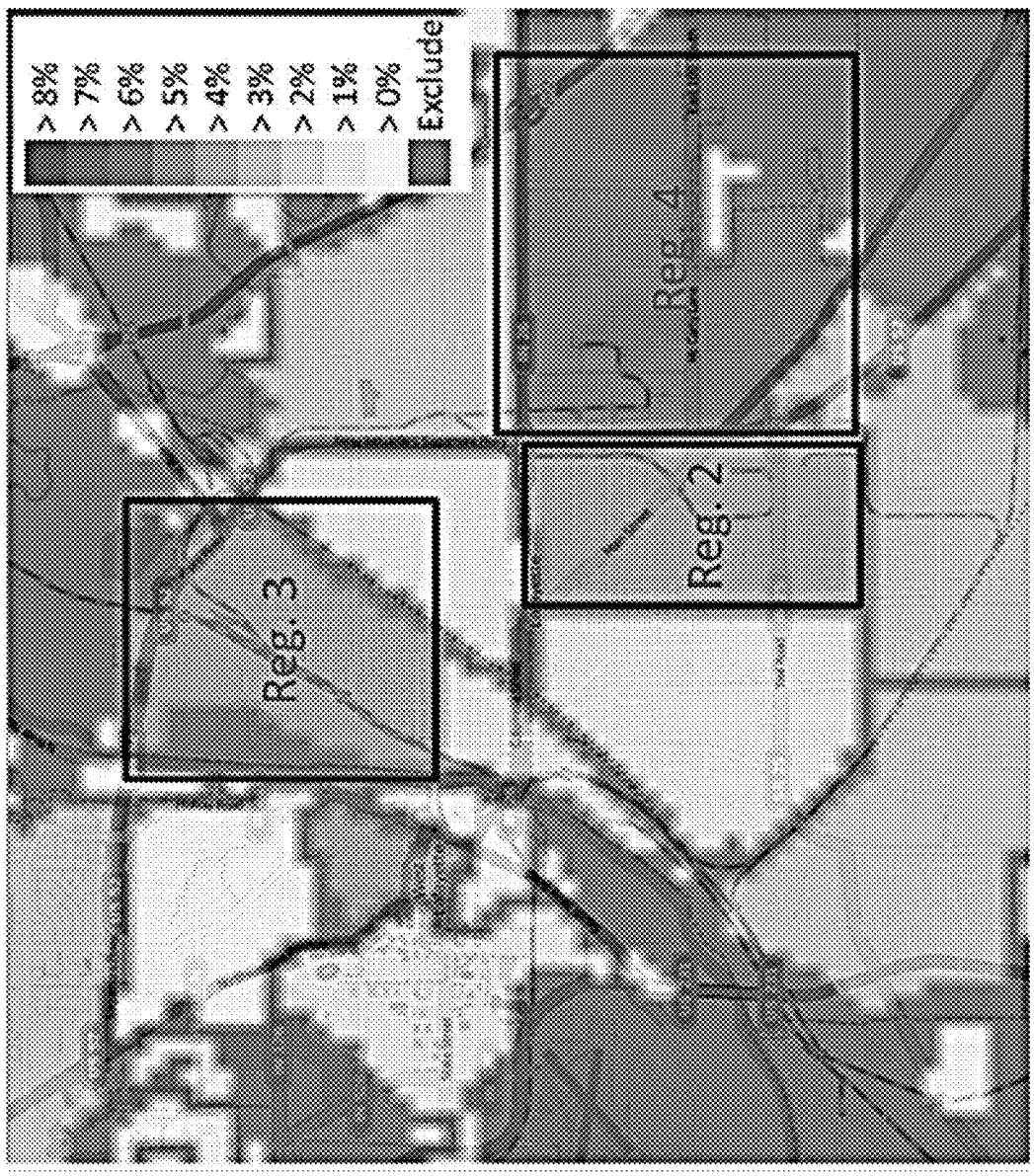
FIG. 4B shows a choropleth map displaying predicted result data based on the template of FIG. 4A.

User Refinement of Geo spatial Template using Domain Knowledge:

The geospatial template provides regions with relatively higher incident rates. The system 1000 further allows users to use their domain knowledge and interactively refine these template regions into sub-divisions. For example, users may choose to sub-divide the formed template regions by natural or man-made boundaries (e.g., state roads, rivers, police beats), or by underlying features (e.g., known drug hot-spots). The system 1000 also allows users to explore the predicted future counts of the created sub-regions by generating an incidence count vs. time signal for each disjoint region and applying the presently disclosed forecasting methodology (see sections above) to find a predicted value for the next day. The results are then shown as a choropleth map to users, for example, as shown in FIG. 4B. These macro-level prediction estimates further assist decision makers in formulating high-level resource allocation strategies.

Kernel Density Estimation:

One of the challenges with using the spatial distribution of incidents in a geospatial predictive analytics process is that it can exacerbate the problem of generating signals with low or no data values. To further refine the prediction model in geospace, the system 1000 utilizes a Kernel Density Estimation (KDE) technique to spread the probability of the occurrence of incidents to its neighboring regions. The rationale behind this is that criminology research has shown evidence that occurrence of certain types of crimes (e.g., residential burglary) at a particular region puts neighboring regions at an elevated risk.

Furthermore, crime also tends to be clustered in certain neighborhoods, and the probability of a crime occurring at a particular location can be highly correlated with the number of recent crimes at nearby locations. The system 1000 incorporates this concept in a novel kernel density estimation method (described further hereinbelow), where the kernel value at a given location depends on the locations of its k-nearest incidents. In addition, kernel density estimation methods take into account that crimes in low-crime or sparsely populated areas have low incidence, but non-zero probability. We utilize two interchangeable density estimation techniques in our implementation.

Kernel Scale based on Distance to the k-th Nearest Neighbor:

To account for regions with variable data counts, the system 1000 utilize a kernel density estimation technique and use a dynamic kernel bandwidth. The system 1000 scales the parameter of estimation by the distance from the point x to its k-th nearest neighbor $X_i$ (i.e., the most distant of the k neighboring incidents). This is shown in Equation 1.

$$\hat{f}(x) = \frac{1}{N}\sum_{i=1}^{N} \frac{1}{\max(h, d_{i,k})} K\left(\frac{x - X_i}{\max(h, d_{i,k})}\right) \qquad (1)$$

Here, N is the total number of samples, $d_{i,k}$ the distance from the i-th sample to the k-th nearest neighbor incident and h is the minimum allowed kernel width. We use the Epanechnikov kernel to reduce calculation time, which is given by $K(u)=\frac{3}{4}(1-u^2)1_{\|u\|\leq 1}$. Here, the function $1_{\|u\|\leq 1}$ evaluates to 1 if the inequality is true and to 0 otherwise. In cases where the distance from the i-th sample to the k-th nearest neighbor is 0 (e.g., multiple calls from the same address), we force the variable kernel estimation to a minimum fixed bandwidth h. Making the kernel width placed at the point $X_i$ proportional to $d_{i,k}$ gives regions with sparse data a flatter kernel, and vice-versa.

Dynamic Covariance Kernel Density Estimation Technique (DCKDE):

The kernel in the previous method is based on the distance from an incident location to its k-th nearest neighbor, which provides a flatter kernel for sparse regions. In a novel kernel method according to the present disclosure, the system 1000 uses the information from all k-nearest neighbors to calculate the width of the kernel (rather than the most distant neighbor), thus reducing stochastic variation on the width of the kernel. As such, the geospatial region is fragmented into rectangular grids and then the system 1000 utilizes a Gaussian kernel at every grid node that is based on the covariance matrix of the location of the center of each node X={x, y} and its k-nearest neighbor incidents. Therefore, the kernel value is influenced by the k-nearest neighbors and provides a wider kernel in sparsely populated regions that enables the model prediction to be small but non-zero and also takes into account correlations between latitude and longitude; thus, improving the accuracy of the estimates. The value stored at each node location is given by $$\delta(X) = \frac{1}{2\pi|V|} e^{-\frac{1}{2}(X-\mu)^T V^{-1}(X-\mu)}$$

where $\mu=\{\mu_x, \mu_y\}$ is the mean along the x and y directions of the k nearest neighbors and their covariance matrix V is defined according to Equation 2.

$$V = \begin{bmatrix} \sigma_x^2 & cov_{x,y} \\ cov_{x,y} & \sigma_y^2 \end{bmatrix} \quad (2)$$

In Equation 2, $\sigma_x^2$ and $\sigma_y^2$ is the variance along the x and y dimension respectively, and $$cov_{x,y} = \sum_{i=1}^{k} \frac{(x_i - \mu_x)(y_i - \mu_y)}{k-1}$$

is the sample covariance between x and y.

Neighbors with Similar Spatio-Demographics:

For regions that generate a signal of lower statistical significance for the user selected categories, the system 1000 provides the option to explore data in similar neighborhoods. For each census block, the system 1000 utilizes spatiodemographic census data to find those census blocks that exhibit similar spatial demographics. The rationale behind finding similar neighborhoods lies in the fact that regions with similar demographics tend to exhibit similar trends for certain types of crime.

The process of finding similar census blocks for a given census block X includes computing the similarity distance from X to all neighboring census blocks that lie within a d mile radius from the centroid of X. The d mile radius constraint is imposed to factor in for Tobler's first law of geography that suggests that near regions are more related to one another than distant regions. We use d=3.0 miles in our implementation. As such, the similarity distance between two census blocks A and B given k census data variables is given by $$S_{A,B} = \sqrt{\sum_{i=1}^{k}(A(V_i) - B(V_i))^2},$$

where $A(V_i)$ and $B(V_i)$ are the corresponding census data variable values (e.g., race, income, and age demographic data) for census blocks A and B respectively. Finally, the top N census blocks with the smallest similarity distance values are chosen as the similar census blocks for the given census block X. In one example, the system 1000 uses N=5 as a default value in the implementation, but may also provide users with options to change this value on demand. This concept may be extended to find similar neighborhoods to determining similar data categories for predictive purposes.

The system 1000 now provides users with the ability to generate similar neighborhood prediction maps where the prediction for a given census block X depends on the historic time series data of its N similar census blocks in addition to the past data of the census block X itself. Here, the input time series for the census block X used in the prediction algorithm is the per time step average of the N similar census block signals combined with the original signal from census block X. The resulting prediction maps incorporate the influence of incidence rates in neighborhoods that share similar spatio-demographic data.

Temporal Natural Scale Templates:

As noted previously, crime trends exhibit not only monthly and seasonal trends, but also shows day-of-the-week and hour-of-day variations. The prediction maps produced by the methods described so far provide prediction estimates over 24-hour periods. This information, albeit valuable to the law enforcement community in developing resource allocation strategies for their precincts, provides little detail of the 24-hour distribution of crime. Below is described a further method according to the present disclosure to assist users in creating natural temporal scales.

Figure 2A:
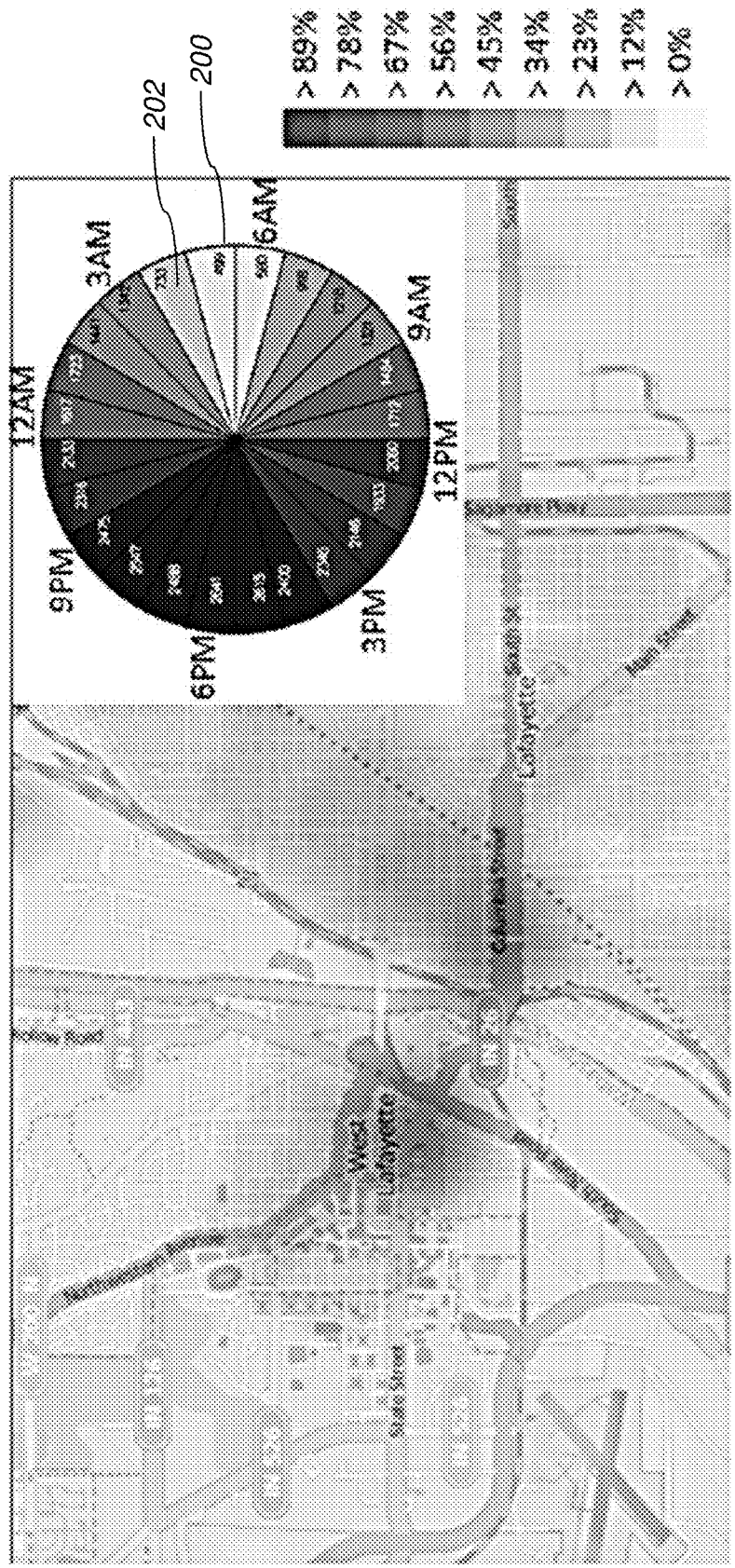
FIG. 2A shows a spatiotemporal distribution of historical indicent data with a radial time display for a first time period selection according to one embodiment.
Figure 2B:
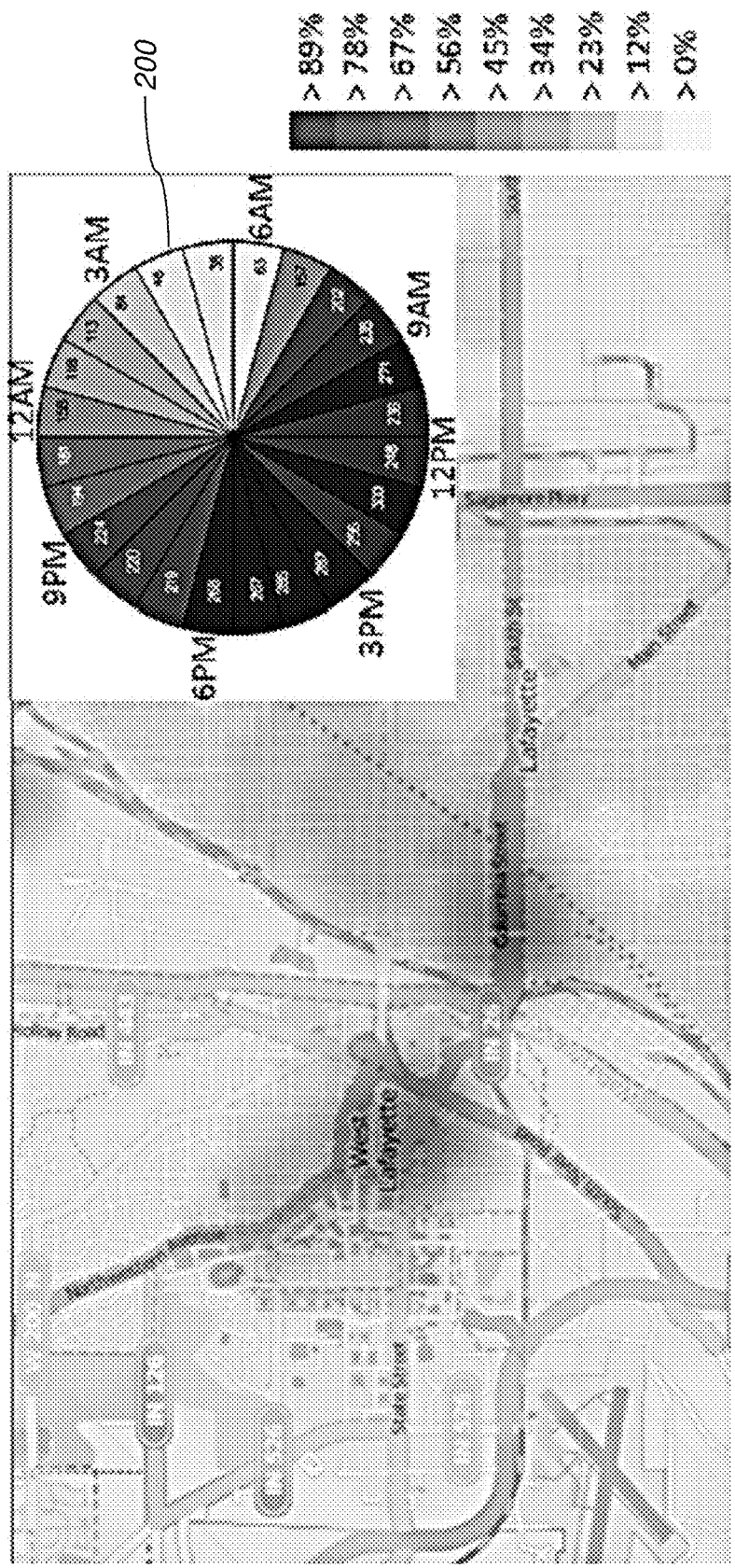
FIG. 2B shows a spatiotemporal distribution of historical indicent data with a radial time display for a second time period selection according to one embodiment.

Interactive Clock Display:

FIG. 2B shows an interactive clock view display 200 which presents temporal hourly data in a radial format. The clock view display 200 provides a way for users to filter the data by the hour by interactively clicking on the desired hours (in the illustrated view, represented by pie sections 202), thereby restricting or filtering down the data for use in the prediction process. Users may use the clock view display 200 to obtain a visual summary of the hourly distribution of the incidents and consequently make informed decisions on creating temporal templates over which good prediction estimates may be established.

Factoring in for Monthly and Day-of-the-Week Variations:

In addition to utilizing the seasonal trend decomposition technique described above to decompose the time series signals into its various components, the system 1000 optionally utilizes a direct approach where users are allowed to create their own custom monthly and/or daily templates. Certain crimes tend to peak on certain days of the week (e.g., alcohol related violations tend to be higher over the weekend), whereas other crimes tend to be lower on other days (e.g., reported burglaries drop over the weekend). As such, the system 1000 factors for these effects directly in the system 1000 and allow users to filter data specifically by month and/or by day-of-the-week. This further assists decision makers in developing and refining their resource allocation strategies.

Refinement using Summary Indicators:

The system 1000 further assists users with refining and choosing appropriate hourly templates in the prediction process. According to one embodiment, the system 1000 computes the median minute of CTC incident for the selected 24-hour binning period that provides information about when exactly half of the incidents for the selected date range and offense types have occurred. Next, to get an indication of the dispersion of crime within the 24-hour period, the system 1000 computes the first quartile minute and third quartile minute for the selected data, which are the median times of the first and second halves of the 24-hour period from the median minute respectively. Finally, as temporal data can be inaccurate with many incidents that have missing time stamps, the system 1000 provides users with an accuracy indicator to show the percentage of cases with valid time stamps. These summary indicators, along with the temporal templates described above, enable users to further refine their selected temporal templates for use in the prediction process. Example scenarios where these summary indicators are used are provided in the sections below.

Geospatial Prediction:

In one example, a visual analytics process implemented by the system 1000 involves a domain expert selecting appropriate data parameters, applying desired data filters and generating spatial and temporal natural scale templates using the methods described above. Next, the system 1000 incorporates the STL forecasting method (described above) and extends it to the geospatial domain to provide prediction estimates for the next N time steps (e.g., days, weeks, months). We now list the steps involved in the geospatial prediction methodology utilized by the system 1000:

1. Dividing geospace into sub-regions: The first step in the method, as described in the above section "Geospatial Natural Scale Templates Based on Spatiotemporal Incident Distribution", involves subdividing geospace into either uniform rectangular grids of user specified resolutions or man-made geospatial boundaries.
2. Generating the time series signal: The system 1000 then extracts a time series signal for each sub-division. In one embodiment, we allow two types of signals to be extracted for each sub-division: (a) incidence count vs. time step, and (b) kernel value vs. time step. Note that the signal generated in (a) is the same as that produced in the above time series 100 of FIG. 1. The kernel values used in (b) are generated using any one of the methods described in the sections "Kernal Scale based on Distance to the k-th Nearest Neighbor" or "Dynamic Covariance Kernal Density Estimation Technique (DCKDE)" above.
3. Forecasting: The time series signal generated for each spatial unit is then fed through the STL process described above where a forecast is generated for the next N time steps (e.g., days, weeks). This process is repeated for all region sub-divisions and prediction maps are finally obtained for the next N time steps.
4. Visualizing results: Finally, the results of our forecasting method are provided to the user either in the form of a chloropeth map or a heatmap.

When users choose to fragment the geospace into uniform rectangular grids, the system 1000 provides them with the ability to select the resolution level, or, in other words, the grid size of each grid. An incidence count vs. time step signal is then generated for each sub-region. It is important to note here that a grid resolution that is too fine may result in a zero count vs. time step signal that has no predictive statistical value. On the other hand, a grid resolution that is too coarse may introduce variance and noise in the input signal, thereby over-generalizing the data. An evaluation of our forecasting approach (described in more detail below) indicates that an average input size of 10 samples per time step provide enough samples for which our method behaves within the constraints and assumptions of our STL forecasting approach. This metric is then utilized in the system 1000 in order to determine the applicability of our forecasting method for a particular sub-region.

FIG. 3 shows a series of examples that demonstrate geospatial prediction results using the methods described in this section. Here, the user has selected all CTC incidents for Tippecanoe County, IN, and is using 10 years' worth of historical data (Mar. 11, 2004 through Mar. 10, 2014) to generate forecast maps for the next day (i.e., for Mar. 11, 2014). FIG. 3A shows the prediction results (when Tippecanoe County, IN is fragmented into rectangular grids of dimension 64×64, with the shading of each region 300 indicating the forecast result for that region. The input data for each sub-region consists of daily incidence count data over the last 10 years. This method, unlike the KDE methods, does not spread the probability to surrounding neighborhood regions when an incident occurs at a particular place. As a result, this method treats each region 300 independently, and can be used when there are no correlations between geospatial regions (e.g., commercial vs. residential neighborhoods). This method can also be useful in detecting anomalous regions and regions of high predicted levels of activity. For example, the user notices something peculiar from the results in FIG. 3A: a predicted hotspot occurs prominently over the Sheriff's office and county jail location (labeled as TCPD in FIG. 3A). This occurs because the default geospatial location of many incidents are logged in as the county jail, especially when arrests are associated with cases. To remedy for this, the user can refine the underlying geospatial template (see above sections) and dynamically remove this location from the geospatial template. The refined prediction map generated is shown in FIG. 3B.

Figure 3A:
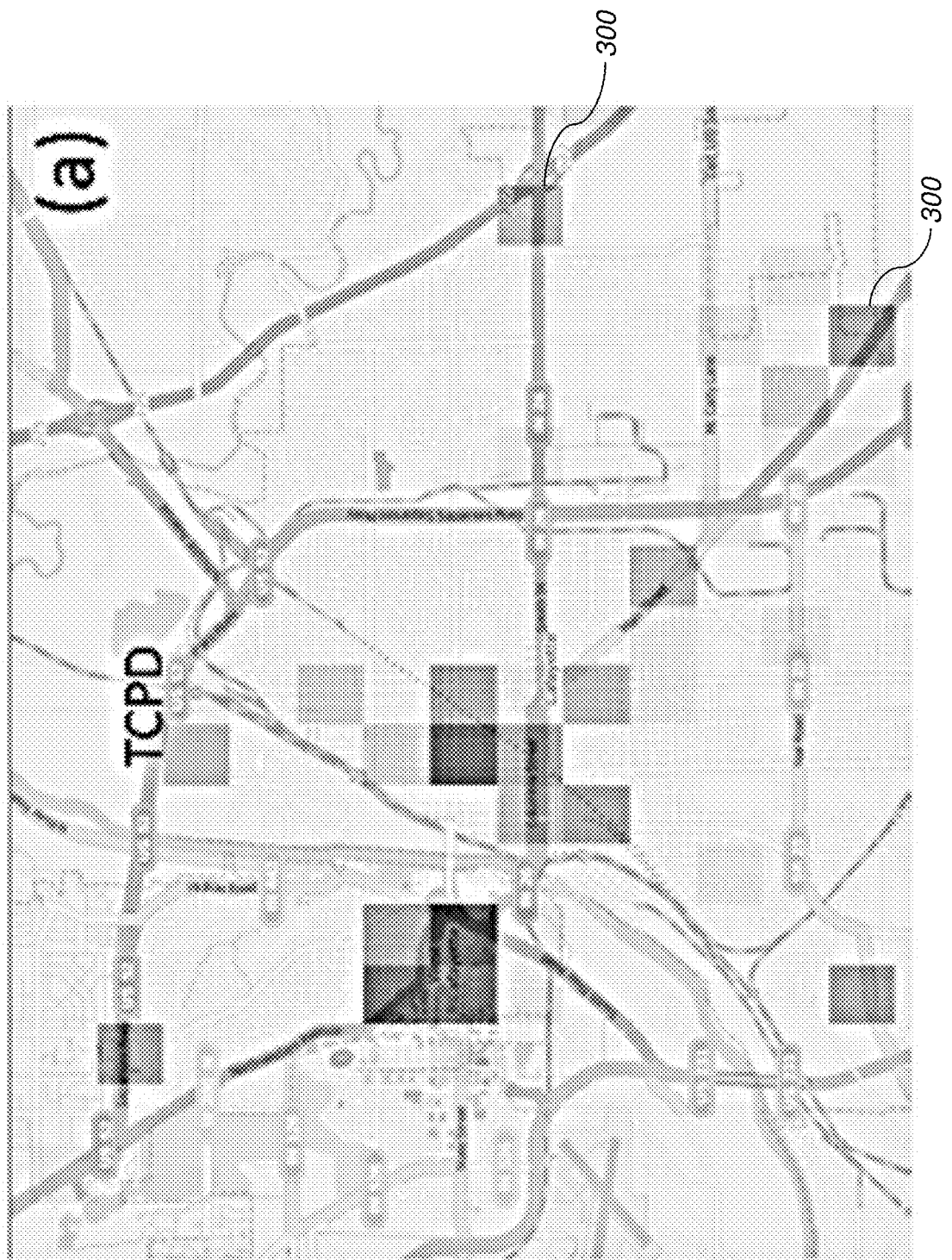
FIG. 3A shows a geospatial prediction choropleth map using rectangular grids according to one embodiment.
Figure 3B:
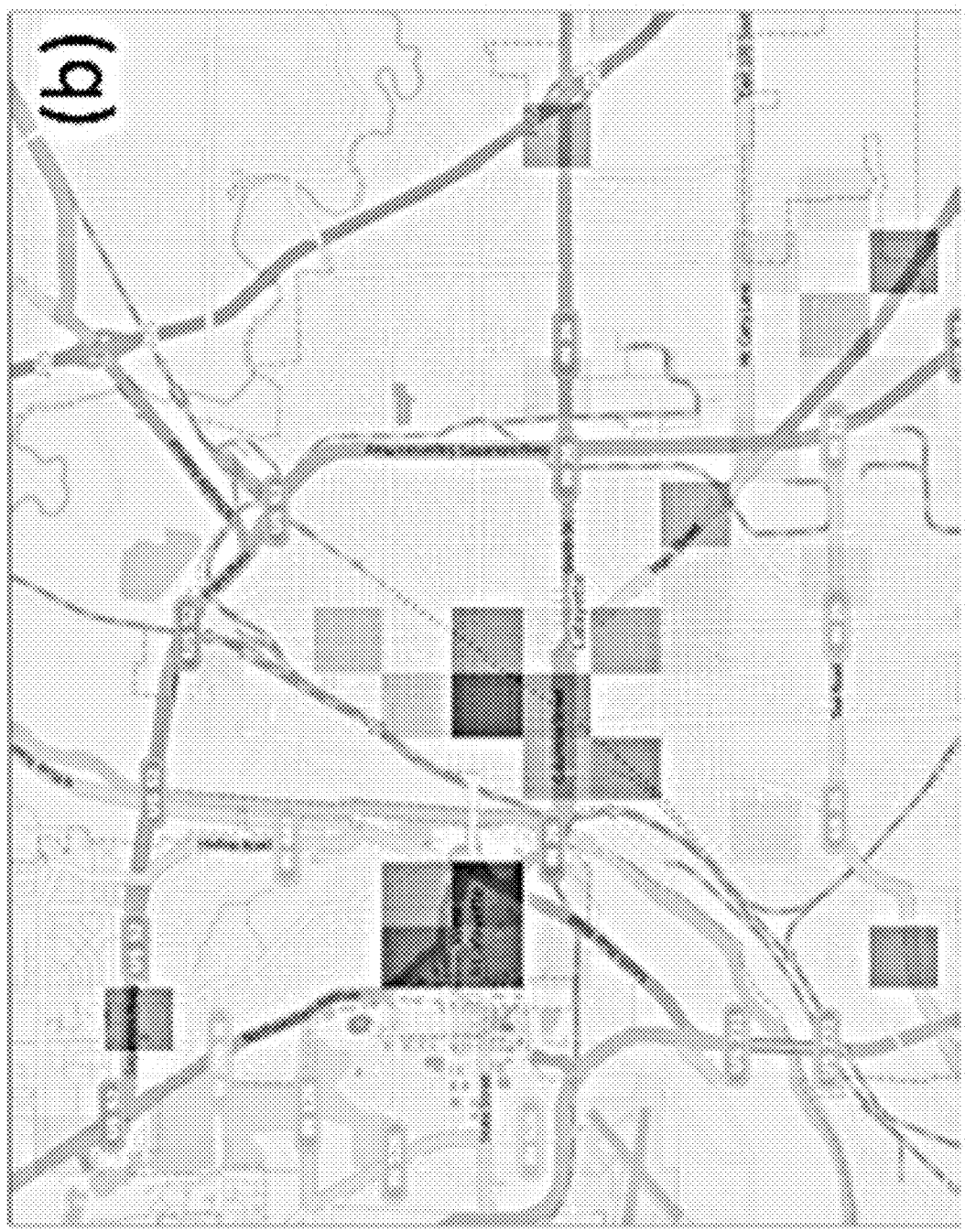
FIG. 3B shows the map of FIG. 3A after further refinement according to one embodiment.
Figure 3C:
FIG. 3C shows a geospatial prediction map using kernel density estimation based on a k-th nearest neighbor method according to one embodiment.
Figure 3D:
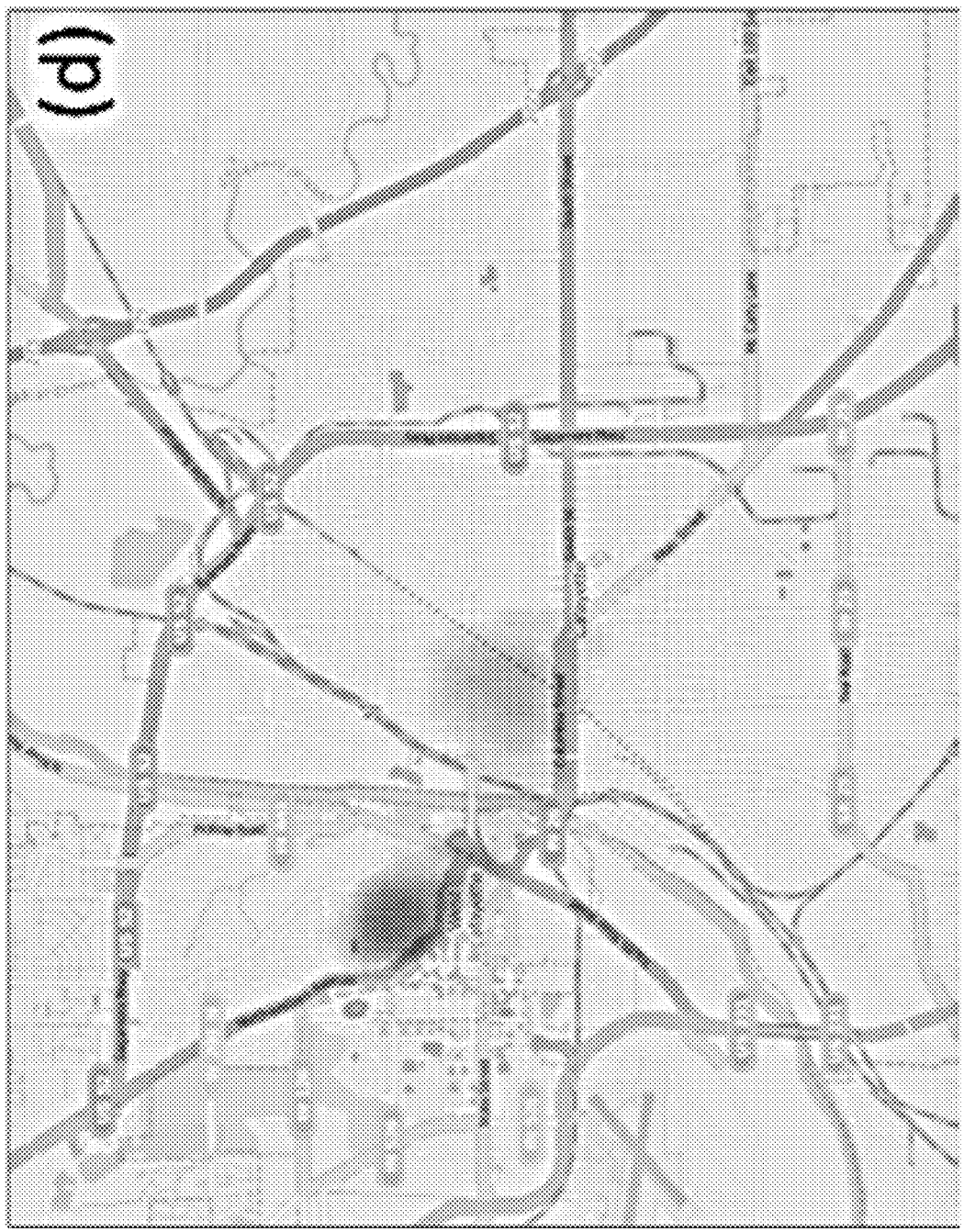
FIG. 3D shows a geospatial prediction map using kernel density estimation based on a dynamic covariance kernel density estimation method according to one embodiment.

FIGS. 3C and 3D show the predicted results of using the kernel density estimation based on the distance to the k-nearest neighbor approach (described above) and the DCKDE technique (also described above), respectively. The KDE method applied to generate the prediction map in FIG. 3C provides a flatter kernel for relatively low-crime regions. As a result, the prediction map provides lower, but non-zero, predictions for these regions. The kernel width computed using this method is based on the distance from a point x to its k-th nearest neighbor only. The DCKDE method, on the other hand, assumes that the probability of the occurrence of an incident at a particular location is correlated with the number of recent incidents at nearby locations. Accordingly, this method utilizes information from all k-nearest neighbors in calculating the kernel value. Thus, the regions with persistently higher incident concentrations generate focused hotspots when forecasting is performed using the DCKDE method. Finally, it should be noted that each method provides users with different insights into the dynamics of the underlying processes, and users can use their domain knowledge to further refine the results to make informed decisions.

Case Study: Forecasting Future Criminal, Traffic, and Civil (CTC) Incidence Levels:

Below we demonstrate our work by applying our spatiotemporal natural scale template methodology using system 1000 to forecast for CTC incidence levels in Tippecanoe County, IN, U.S.A. This dataset consists of historical reports and provides several different attributes, including the geographic location, offense type, agency, date, and time of the incident. This dataset contains an average of 31,000 incidents per year for Tippecanoe County, and includes incidence reports for different categories of CTC incidents (e.g., crimes against person, crimes against property, traffic accidents). We use 10 years' worth of historical data for this analysis. We provide a workflow when using our system 1000 in the analysis process.

Forecasting for all geospatial CTC Incidents:

Here, we describe a hypothetical scenario in which a law enforcement shift supervisor is using the system 1000 to develop resource allocation strategies for Tippecanoe County over the next 24 hour period for Tuesday, Mar. 11, 2014. The supervisor is interested in developing a high-level resource allocation strategy, in particular, by police beats for the next 24 hour period. Law enforcement officers are generally assigned to a particular law beat and patrol their beat during their shift hours when not responding to a call for service. The supervisor is also interested in determining which hotspot locations to focus on for larger police beats. Finally, he also wants to refine the developed resource allocation strategy to factor in for the hourly variation of crime. To develop an appropriate resource allocation strategy, the shift supervisor performs several different analyses that are described in the following subsections. Although this example uses data for all CTC categories as inputs, users may filter their data using any combinations of CTC categories (e.g., crimes against property, person) to further refine their resource allocation strategy. It shall be further understood that the above methods may be used to analyze and predict incidence data in other contexts, including, but not limited to, health care incidents or needs, and distribution and logistics operations.

Overall Daily Resource Allocation:

The shift supervisor begins his process by visually exploring the spatiotemporal distribution of historical incidents using the system 1000. When working with the system 1000, the supervisor then visualizes the geospatial and hourly distribution of the incidents that occurred over the past 2 years, as shown in FIG. 2A. The supervisor notes several hotspots emerge for the selected period. The locations of these hotspots match with his domain knowledge of the area (e.g., city downtown regions, shopping center locations across town). The static image of the aggregate data, however, does not factor in the inherent spatiotemporal data variations, and basing a resource allocation decision on this image alone would be insufficient. The supervisor is also aware of the fact that police presence can act as a deterrent for certain types of crimes, and, therefore, wants to diversify and maximize police presence in these hotspot areas.

Next, the supervisor wants to factor for monthly and day-of-the week patterns in his analysis. As such, he visualizes the geospatial and hourly distribution of all CTC incidents that occurred on any Tuesday in the month of March over the past 10 years (see above). The result is shown in FIG. 2B. The supervisor notes a slightly different geospatial distribution emerges as a result, with the intensity of hotspots shifting towards the east downtown Lafayette region. In this case, it also becomes apparent that for the 24-hour distribution, 10 AM, 1 PM and 3 PM-6 PM emerge as high activity hours.

Allocating Resources by Police Beats:

In order to narrow down the geospace and focus on relevant geographic locations, the supervisor decides to apply the geospatial template generation technique (see above sections "Geospatial Natural Scale Templates based on Spatiotemporal Incident Distribution" and "User Refinement of Geospatial Template using Domain Knowledge") with all CTC incidents selected using 10 years' worth of historical data (i.e., from Mar. 11, 2004 through Mar. 10, 2014). The resulting geospace generated is shown in white in FIG. 4A. The supervisor notes that the resulting regions correspond to highly populated areas, and exclude areas of infrequent occurrences. Next, the system 1000 provides a total predicted number of incidents, N, for Mar. 11, 2014 for the filtered geospatial region. This is done by generating a total incidence count vs. day time series signal using the past 10 years' worth of data and applying the STL forecasting method described above. Here, N is 59 incidents.

Next, the supervisor is interested in obtaining a high level overview of the distribution of the predicted incidents over geospace, and, in particular, by police patrol routes. As such, the supervisor uses system 1000 and fragments the generated geospatial template using the city law beats shapefile. The resulting geospace is shown in FIG. 4B. In order to distribute the total predicted 59 incidents across police beats, the system 1000 computes an incidence count vs. day time series signal for each disjoint geospatial region and computes the predicted number of incidents ni for each region (described above). Next, the probability of an incident within each disjoint region is calculated using the formula $p_i = n_i/N * 100$. The results of this operation are then shown to the user as a choropleth map, where each disjoint region is colored according to its value on a sequential color scale (FIG. 4B).

Geospatial Resource Allocation Strategy Refinement using Domain Knowledge:

While the high level police beat prediction map (FIG. 4B) suggests putting a heavier emphasis on the eastern police beats of the city, the prediction results in FIG. 3 indicate a more localized concentration of incidents at the city downtown locations. The shift supervisor may use these results and allocate higher resources to the eastern police beat of the city (Reg. 4 in FIG. 4B), and allocate a smaller number of resources, but at more concentrated locations in the downtown (Reg. 1 in FIG. 4B).

Figure 5:
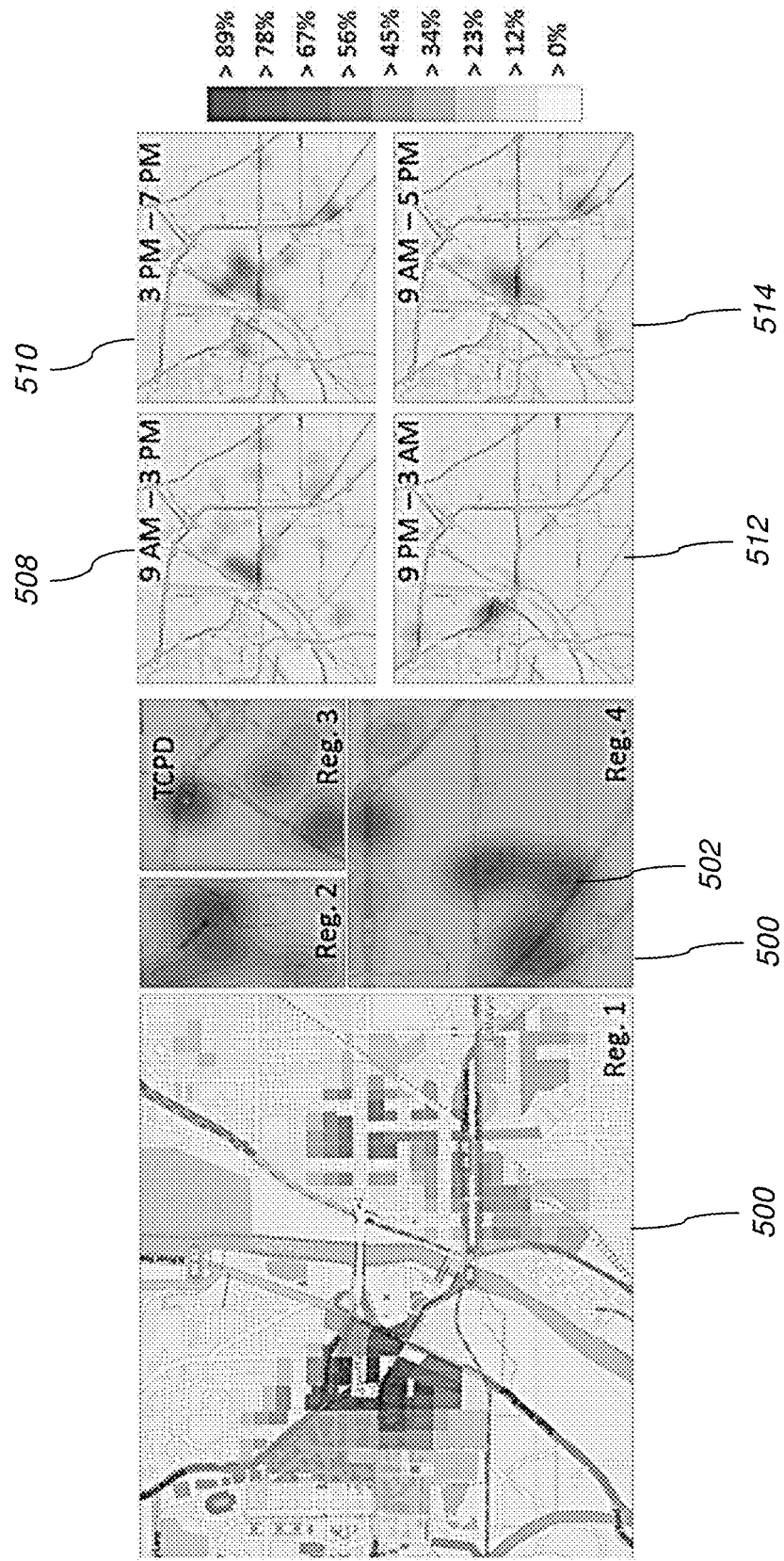
FIG. 5 shows the results of a user refinement of geospatial resource allocation strategy for a plurality of geospatial regions according to one embodiment.

Now, the supervisor is interested in further refining her geospatial resource allocation strategy. First, she turns to the predicted hotspot regions in the city downtown regions (Reg. 1 in FIG. 4). She decides to utilize the census blocks spatial boundary information and divides the geospace into census blocks. Next, she uses the method geospatial prediction method above to create a predicted choropleth map based on census blocks for the region. The result of this operation is shown in FIG. 5 (Reg. 1). Here, the supervisor has chosen to use the kernel values obtained from the method described in the section above describing the "Kernel Scale based on Distance to the k-th Nearest Neighbor" method and spread them across the underlying census blocks for generating these results.

To obtain detailed predictions for the eastern city police beat region (Reg. 4 in FIG. 4B), the shift supervisor uses a different approach where she draws a region around the selected beat using the mouse and restricts the forecast to the selected region. The result of this operation is shown as heatmaps 500 in FIG. 5 (Reg. 4). From domain knowledge, she knows that this area has a high concentration of shopping centers. The hotspots 502 obtained in FIG. 5 (Reg. 4) align with these locations. Finally, the supervisor generates similar heatmaps for regions labeled as Reg. 2 and 3 in FIG. 4B, the results of which are shown in FIG. 5 (Reg. 2 and 3), respectively. Note that the county jail location is once again a hotspot in FIG. 5 (Reg. 3). With these detailed results in hand, the shift supervisor is able to devise an optimal resource allocation strategy for the next 24 hour period in Tippecanoe County.

Applying Temporal Templates:

Finally, in order to refine her resource allocation strategy to different portions of the day, the shift supervisor chooses to apply the summary indicators method described above. She finds that the first, median, and third quartile minutes for CTC incidents that occurred in the past 10 years were 9:25 AM, 3:11 PM and 7:28 PM respectively. She also notes that these indicators correspond with the hourly distribution of incidents using the clock view display in FIG. 2. Therefore, the supervisor chooses two hourly templates using these summary indicators: (a) 9 AM through 3 PM, and (b) 3 PM through 7 PM, respectively. The supervisor also creates two other hourly templates: (c) 9 PM through 3 AM to capture night time activity, and (d) 9 AM through 5 PM to capture working hours of the day. She then uses the kernel density estimation method (described in the section above describing the "Kernel Scale based on Distance to the k-th Nearest Neighbor") and re-generates prediction maps for Mar. 11, 2014.

These results are shown in FIG. 5, where the maps 508, 510, 512, and 514 are the results of applying the templates (a), (b), (c) and (d). As expected, the supervisor notes the shift in hotspot locations through the 24 hour period, which further enables the refinement of the resource allocation strategy for the different portions of the 24 hour period.

Model Evaluation and Validation:

In order to evaluate our methodology, a series of statistical tests was conducted to understand the behavior and applicability of our approach in the spatiotemporal domain using the system 1000. The validation strategy involved testing for the empirical rule of statistics, which describes a characteristic property of a Normal distribution: 95% of the data points are within the range $\pm 1.96\sigma$ of $\mu$, where $\mu$ and $\sigma$ are the mean and standard deviation of the distribution, respectively. In order to help alleviate the challenges resulting due to the sparseness of the underlying data, we performed our analyses over a weekly data aggregation level. The approach involved testing whether the 95% prediction confidence interval bound acquired for the geospatial predictions using our forecasting approach holds when compared against observed data. This confidence bound would be violated if the variance of the observed data is higher (i.e., overdispersed data) or lower (i.e., underdispersed data) than that dictated by the prediction confidence bound. When the 95% prediction bounds are met as expected, and the data conforms to the Normal regime, the applicability of our spatiotemporal STL forecasting method is established.

Building on the STL based time series prediction discussion above, the variance of the fitted values $\hat{Y}=(\hat{y}_1, \ldots, \hat{y}_n)$ using the loess operator in the STL decomposition step is given by $$\text{Var}(\hat{Y}_i) = \hat{\sigma}^2 \sum_{j=1}^{n} H_{ij}^2. \qquad [20]$$

Here, $\hat{\sigma}^2$ is the variance of the input time series signal Y, and is estimated from the remainder term $R_y$. Subsequently, the variance for the predicted value $\hat{Y}_{n+1}$ for time step n+1 is given by $$\text{Var}(\hat{Y}_{n+1}) = \hat{\sigma}^2 \left(1 + \sum_{j=1}^{n} H_{n+1,j}^2\right).$$

This provides the 95% prediction interval as $CI_{n+1} = \hat{Y}_{n+1} \pm 1.964\sqrt{\text{Var}(\hat{Y}_{n+1})}$.

Next, a series of analyses was performed at varied geospatial and temporal scales, and for different data categories. The geospace was first fragmented into sub-regions (either rectangular grids or using man-made boundaries), and time series signals were generated for each geospatial sub-region. In our analyses, we utilized a sliding time window of size 3 years (i.e., 3×52 weeks) that provided enough samples above the Nyquist frequency for the STL forecasting technique. Forecasting was performed using the methods described in the sections concerning "Geospatial Prediction" and "Modified STL forecasting method to factor in for weekly data aggregation." We provide our evaluation methodology and results in the subsequent sub-sections.

Modified STL Forecasting Method to Factor in for Weekly Data Aggregation:

As described above in the "Time Series Prediction using Seasonal-Trend-Decomposition Based on LOESS (STL)" section above, a time series signal $\sqrt{Y}$ can be considered to consist of the sum of its inter-annual ($T_y$), yearly-seasonal ($S_y$), day-of-the-week ($D_y$), and remainder variation ($R_y$) components. However, since we used a weekly aggregation of data, the day-of-the-week component ($D_y$) must be excluded. Therefore, the time series signal gets modified to $\sqrt{Y_y} = T_y + S_y + R_y$. The prediction step, which involves predicting the value for week n+1, remains the same as given above.

95% Prediction Interval Accuracy vs. Input Data Average (Avg(Y)):

In this method, the geospace was first fragmented into either: (a) rectangular grid regions of dimension $\forall k \in [1,128]$, with 128 chosen as upper threshold to provide a fine enough geospatial resolution), or (b) man-made geospatial regions (e.g., census blocks, census tracts, law beats, user-specified regions). For each geospatial region, we first generated the incidence count vs. week signal (denote this signal as Y) for a time window of n weeks beginning from the week of, e.g., Jan. 1, 2009. The modified STL forecasting method described above was used to calculate the 95% prediction interval CI for the predicted week n+1, and tested whether the observed data for week n+1 fell within the calculated 95% prediction interval for that geospatial region. The average of the input signal Y, Avg(Y), was also calculated.

Next, the input time window was shifted by one week to generate the corresponding incidence count vs. week signal (so, this signal would begin from the week of Jan. 7, 2009). We again computed Avg(Y), and CI for the predicted week n+1. As before, we tested whether the observed data for the predicted week n+1 fell within the calculated 95% prediction interval. We repeated the process by sliding the time window till it reached the end of available data. For each Avg(Y) value, we maintained two counters that kept track of the number of instances the observed data was within the 95% prediction interval ($C_{Correct}$), and the total instances encountered thus far ($C_{Total}$). Finally, Avg(Y) values were binned, and $C_{Correct}$ and $C_{Total}$ were summed for each bin. The 95% prediction interval accuracy for each Avg(Y) bin is then given as $$\frac{\Sigma_{bin} C_{Correct}}{\Sigma_{bin} C_{Total}} \times 100\%.$$

Figure 6:
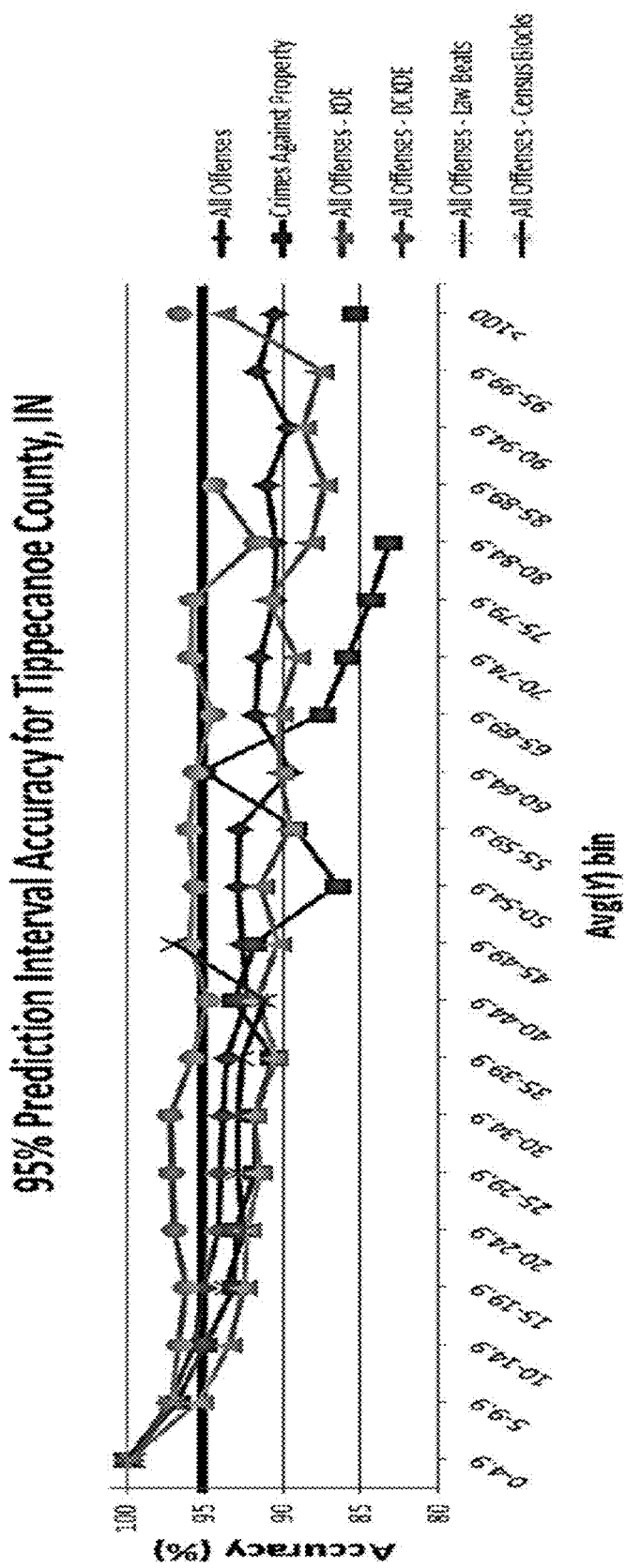
FIG. 6 shows 95% prediction interval accuracy vs. Avg (Y) for different CTC offenses for a sample data set according to one embodiment.

Results and Discussion:

FIG. 6 shows the 95% prediction interval accuracy results for different CTC offenses for Tippecanoe County, IN using system 1000 utilizing the method described in the above section. As can be observed from these results, when the average bin values are low (e.g., less than 10 input samples), the accuracy levels are higher than the expected 95% confidence bound. This indicates that the data are underdispersed for lower input values. In other words, the variance of the observed data is lower than that of the 95% prediction bound when the underlying data are sparse. This conforms to the expected behavior for predicting using our STL forecasting technique: the model predictions get biased if the underlying data are too sparse.

As the input signal average (Avg(Y)) values get larger (i.e., more than 10 samples per time step), the prediction accuracy starts to converge at around the expected 95% accuracy level. For example, the prediction interval accuracy for all offenses converges at around 93%. Also, note that the prediction accuracy using the DCKDE method (described above) converges close to the 95% accuracy level; thereby, indicating the efficacy of the technique. It should be noted that since the underlying processes being modeled here (e.g., CTC incidents) are inherently stochastic in nature, perfect 95% confidence bounds will not be achieved (as can be seen from the results in FIG. 6). Furthermore, with an uncertain probability distribution of the underlying data, our application of the square root power transform may not guarantee homoscedasticity (i.e., stabilization of variability). This also contributes to our system 1000 not achieving perfect 95% confidence bounds. However, even though perfect confidence bounds are not achieved (as can be observed from FIG. 6), the accuracy converges close to the 95% bounds. These results show that the underlying data are Normally distributed for higher values of Avg(Y); thereby, satisfying the underlying assumptions of our method used to estimate the 95% confidence interval. This establishes the validity of the claims of our STL prediction methodology in the geospatial domain that the prediction modeling method works as expected as long as the underlying assumptions of the method are satisfied by the data.

FIG. 6 shows the 95% prediction interval accuracy vs. input data average results (described in the "95% prediction interval accuracy vs. input data average (Avg(Y))" section above) for man-made geospatial regions (census blocks and law beats). These results show that the confidence bounds using census blocks are invariably higher than the expected 95% bound, which indicates that the underlying data are underdispersed. Census blocks are small geospatial units, typically bounded by streets or roads (e.g., city block in a city). The smaller Avg(Y) values for census blocks in Tippecanoe County in FIG. 6 (less than 10 input samples) further highlight the sparsity of input data. The combination of higher prediction interval accuracy levels and lower Avg(Y) values are telltale for the data sparseness issues we have described, and suggest that the signals generated using census blocks have low predictive statistical power. This further underlines the need to intelligently combine geospatial regions of lower statistical values to obtain a signal of higher predictive power (e.g., as was done in the Neighbors with Similar Spatio-Demographics section). The 95% prediction interval accuracy results obtained using law beats in FIG. 6, on the other hand, shows the accuracy converging at around the expected 95% confidence interval for higher Avg(Y) values (more than 10 input samples). These results provide further evidence that as the underlying data values become larger and begin to conform to the Normal regime, our geospatial prediction methodology provides prediction estimates that are within the expected 95% prediction confidence interval. This further bolsters the applicability and validity of the STL prediction methodology used by the system 1000 in the geospatial domain.

Figure 7:
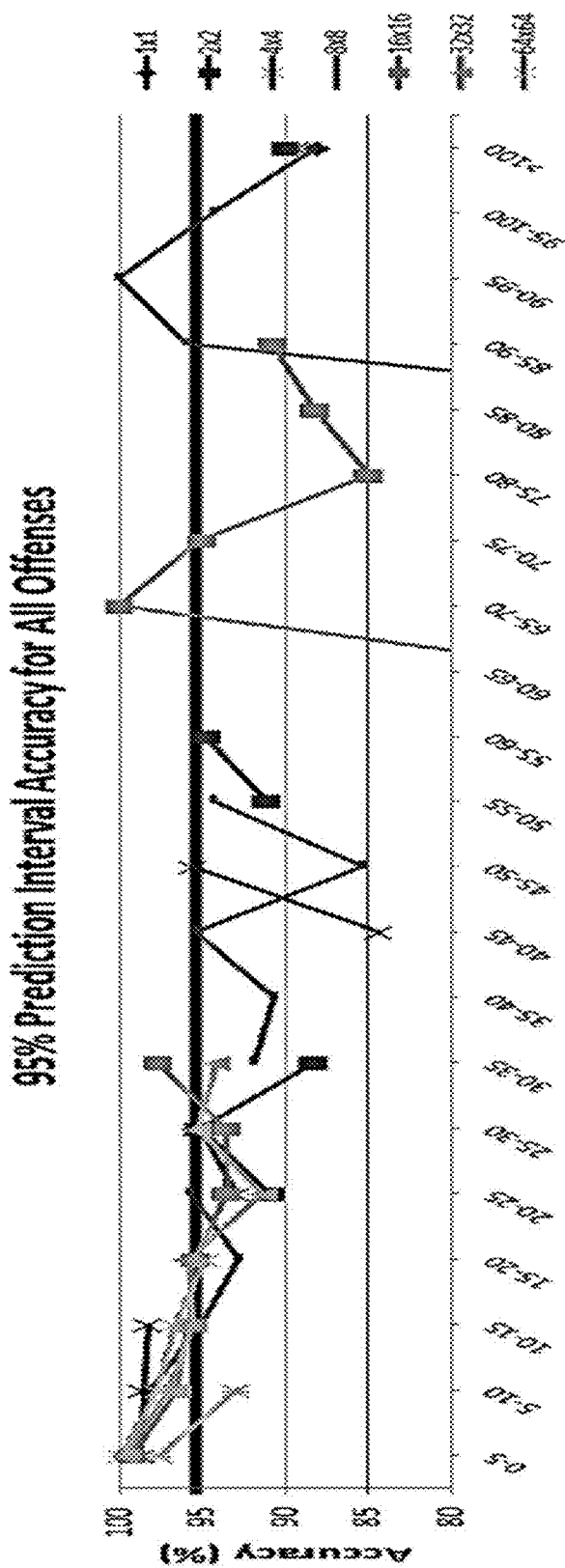
FIG. 7 shows 95% prediction interval accuracy vs. Avg (Y) for all CTC offenses for a sample data set according to one embodiment.

We also applied the method described in the "95% prediction interval accuracy vs. input data average (Avg(Y))" section above to all CTC incident category data and generated 95% prediction interval accuracy vs. the input signal average value (Avg(Y)) plots for different grid resolutions k. These results are shown in FIG. 7. The results indicate that 95% prediction interval accuracy converges at or around the 95% confidence level for large enough Avg(Y) values (i.e., for Avg(Y) bigger than 10). The results indicate that our methodology behaves within the constraints of the Normal regime at higher Avg(Y) values for the different grid dimensions. Also, note that smaller grid dimensions (k) correspond to larger geospatial sub-divisions; and accordingly, smaller k values generate signals of larger counts per bin (i.e., larger Avg(Y) values), especially for regions with higher incidence rates. As can be seen from the results in FIGS. 6 and 7, the accuracy for higher Avg(Y) values tend to be lower than the 95% prediction accuracy; thereby, indicating that the underlying data are slightly overdispersed. These results indicate that coarse scales can generate signals with too much variance, or combinations of multiple signals that overgeneralize the data. Furthermore, the signals generated at coarse scales can be affected by anomalies in underlying data (e.g., crime spikes during unusually high weathers, holidays). These can contribute to the non-Normality of the residuals, and produce an overdispersion of underlying data as compared to the assumptions of our model. It should be noted that although a slight data overdispersion is noticeable at coarse scales, they are deemed to be small enough to currently not warrant any correction. Finally, we note that further research is needed in order to determine the effects of these data overgeneralization issues at coarse scales and to devise strategies to mitigate for their effects.

The model evaluation and validation strategy involved testing for the empirical rule of a Normal distribution where we tested whether the observed data conformed with the 95% prediction interval from our STL forecasting method at various geospatial scales. In order to cope with data sparseness issues, we performed our analysis at a weekly aggregation of data. Our results demonstrate the validity of our approach as long as the underlying assumptions of the underlying models are satisfied by the data. The results obtained using our DCKDE method are also promising. Our results also highlight the importance of performing analysis at appropriate scales, and demonstrate that the model predictions get severely biased when the underlying assumptions are violated by the data. We also explored the effects of data sparseness issues on our model predictions at fine geospatial scales. Our evaluation results show that the model predictions generated using input signals of 10 or more counts per time step on average tend to conform with the 95% prediction confidence intervals. We also highlight the effects of analysis performed at coarse scales, and show the data overgeneralization issues that occur at such scales. Although the results indicate a slight data overdispersion at coarse scales, the results show that the prediction accuracies from the model estimates still tend to converge at around the 95% confidence bounds. This further shows the effectiveness of our forecasting methodology in the geospatial domain. We also note that although our work enables hot spot policing and resource allocation strategy development, further evaluation is required to ascertain the efficacy of our predictive analytics framework when deployed in field.

Figure 8:
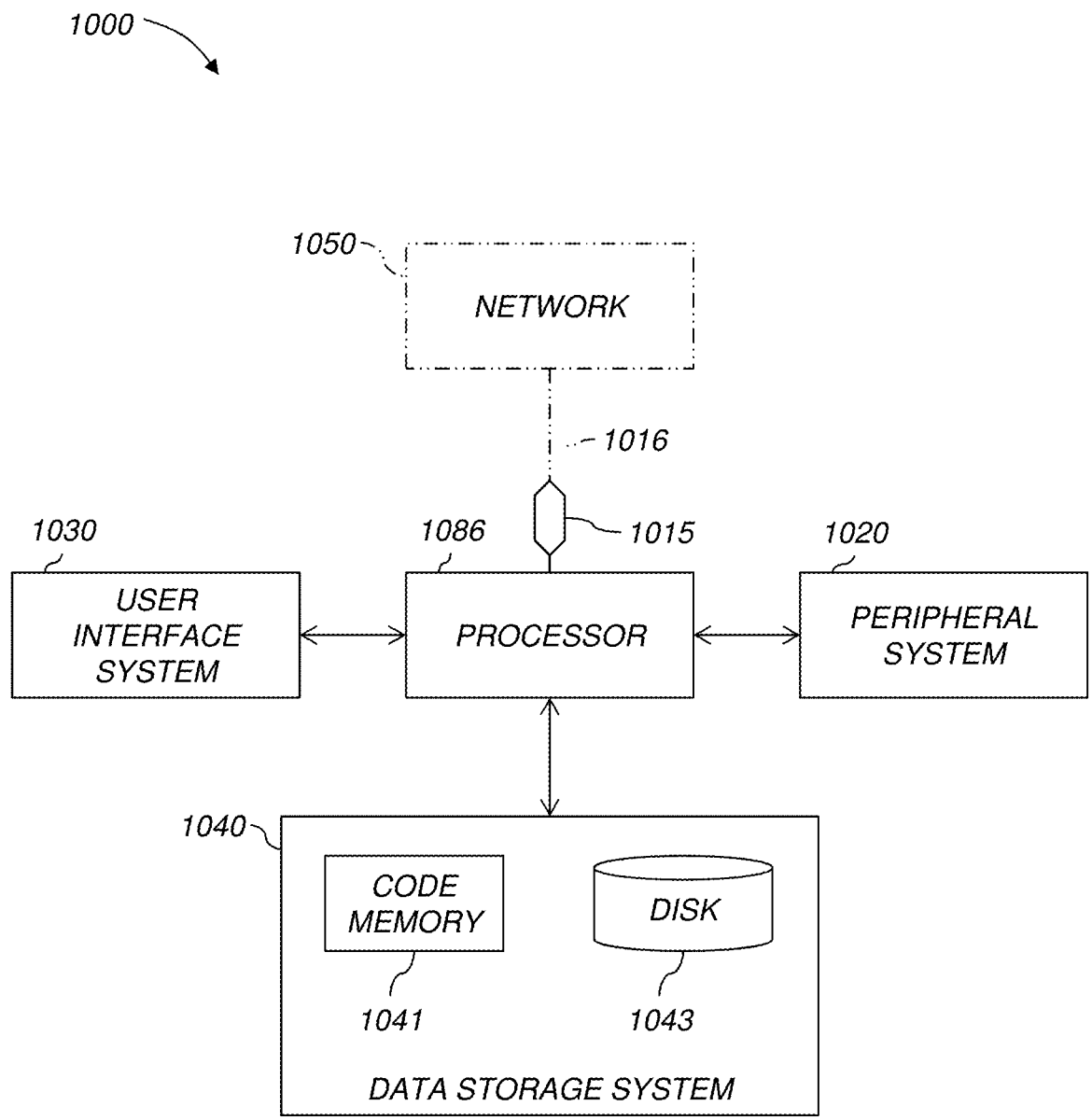
FIG. 8 shows a high-level diagram showing the components of an exemplary visual analytics system according to one embodiment.

FIG. 8 is a high-level diagram showing the components of the exemplary visual analytics system 1000 for predicting and visualizing information at natural scales and performing other analyses described herein, and related components. The system 1000 includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The incidence data may be received using peripheral system 1020 or network 1050 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those skilled in the art will recognize that numerous modifications can be made to the specific implementations described above. The implementations should not be limited to the particular limitations described. Other implementations may be possible.

The invention claimed is:

1. A method, comprising:
   receiving an input, the input comprising a geospatial template digital file representing a desired geospatial resolution and a temporal template digital file representing a desired temporal resolution;
   selectively subdividing the geospatial template digital file based on a defined criteria to produce a plurality of digital geospatial subdivisions;
   generating a digital time series historical signal for each of the plurality of digital geospatial subdivisions within the geospatial template digital file, the digital time series signal defined by the temporal template digital file and based on historical activity data;
   forecasting probability of occurrence of a predetermined event based on the generated digital time series and thus generating a set of forecast results from each of the digital time series associated with selective spatiotemporal variations of each of the plurality of digital geospatial subdivisions; and
   providing the set of forecast results as visual output on an electronic display to a user.

2. The method of claim 1, wherein the visual output comprises a graphical representation of each of the plurality of digital geospatial subdivisions and an indicator of the forecast result for each of the plurality of digital geospatial subdivisions, the indicator displayed within a corresponding digital geospatial subdivision.

3. The method of claim 2, the indicator comprising a color, the color dependent on the forecast result.

4. The method of claim 2, wherein the visual output comprises a choropleth map.

5. The method of claim 2, wherein the visual output comprises a heat map.

6. The method of claim 1, wherein the geospatial template digital file defines a geospatial region having an incident activity level above a first threshold.

7. The method of claim 1, wherein said incident activity level corresponds to crime incidents.

8. The method of claim 1, wherein said incident activity level corresponds to health care need incidents.

9. The method of claim 1, wherein the temporal template defines a time period having an incident activity level above a first threshold.

10. The method of claim 1, wherein the Currently Amended time series signal comprises historical event incidence vs. time step signals.

11. The method of claim 1, wherein the digital time series signal comprises kernel value vs. time step signals.

12. The method of claim 1, wherein said generating a set of forecast results is determined based on seasonal trend decomposition using loess.

13. The method of claim 1, wherein said defined criteria are law enforcement jurisdictions.

14. The method of claim 1, further comprising: providing visual feedback to the user on a display to indicate if the historical activity data is insufficient to produce forecast results having an accuracy above an accuracy threshold.

15. The method of claim 1, wherein the geospatial template digital file or temporal template digital file is based on a predetermined confidence interval.

16. A system, comprising:
   a computer processor; a memory;
   an input device; and
   an electronic display
   wherein the computer processor is configured to:
   receive an input, the input comprising a geospatial template digital file representing a desired geospatial resolution and a temporal template digital file representing a desired temporal resolution;
   selectively subdivide the geospatial template digital file based on a defined criteria to produce a plurality of digital geospatial subdivisions;
   generate a digital time series historical signal for each of the plurality of digital geospatial subdivisions within the geospatial template digital file, the digital time series signal defined by the temporal template digital file;
   forecast probability of occurrence of a predetermined event based on the generated digital time series and thus generate a set of forecast results from each of the digital time series associated with selective spatiotemporal variations of each of the plurality of digital geospatial subdivisions; and
   provide the set of digital forecast results as visual output on the electronic display to a user.

17. The system of claim 16, wherein the visual output comprises a graphical representation of the digital geospatial subdivisions and an indicator of the forecast result for each of the digital geospatial subdivisions, the indicator displayed within a corresponding digital geospatial subdivision.

18. The system of claim 17, the indicator comprising a color, the color dependent on the forecast result.

19. The system of claim 17, wherein the visual output comprises a choropleth map.

20. The system of claim 17, wherein the visual output comprises a heat map.

21. The system of claim 16, wherein the geospatial template digital file defines a geospatial region having an incident activity level above a first threshold.

22. The system of claim 16, wherein said incident activity level corresponds to crime incidents.

23. The system of claim 16, wherein said incident activity level corresponds to health care need incidents.

24. The system of claim 16, wherein the temporal template digital file defines a time period having an incident activity level above a first threshold.

25. The system of claim 16, wherein the digital time series signal comprises historical event incidence vs. time step signals.

26. The system of claim 16, wherein the digital time series signal comprises kernel value vs. time step signals.

27. The system of claim 16, wherein said defined criteria are law enforcement jurisdictions.

28. The system of claim 16, wherein the computer processor is configured to: provide visual feedback to the user using the display to indicate if the historical activity data is insufficient to produce forecast results having an accuracy above an accuracy threshold.

29. The system of claim 16, wherein the geospatial template digital file or temporal template digital file is based on a predetermined confidence interval.

\* \* \* \* \*